US011948410B1

United States Patent

(12) United States Patent
Herron et al.
(10) Patent No.: US 11,948,410 B1
(45) Date of Patent: Apr. 2, 2024

(54) AUTOMATED VEHICLE DIAGNOSTIC SYSTEM AND METHOD

(71) Applicant: Opus IVS, Inc., Ann Arbor, MI (US)

(72) Inventors: Brian J. Herron, Dexter, MI (US); Mark W. Wine, Ann Arbor, MI (US); Ethan Ernst-Hodys, Novi, MI (US)

(73) Assignee: Opus IVS, Inc., Dexter, MI (US)

( * ) Notice: Subject to any disclaimer, the term of this patent is extended or adjusted under 35 U.S.C. 154(b) by 81 days.

(21) Appl. No.: 17/382,011

(22) Filed: Jul. 21, 2021

(51) Int. Cl.
*G07C 5/08* (2006.01)
*G07C 5/00* (2006.01)

(52) U.S. Cl.
CPC .......... *G07C 5/0808* (2013.01); *G07C 5/008* (2013.01); *G07C 5/085* (2013.01)

(58) Field of Classification Search
CPC ....... G07C 5/0808; G07C 5/008; G07C 5/085
See application file for complete search history.

(56) References Cited

U.S. PATENT DOCUMENTS

2008/0208403 A1* 8/2008 Bertosa .................. G06F 17/00 701/31.4
2009/0276115 A1* 11/2009 Chen .................... G07C 5/0808 701/29.6
2010/0205450 A1* 8/2010 Sarnacke ................ B60R 25/00 713/185
2012/0046826 A1* 2/2012 Panko .................. G07C 5/0858 702/81
2013/0246135 A1* 9/2013 Wang ................... G07C 5/0808 701/2
2013/0274993 A1* 10/2013 Gregg .................... G07C 5/085 701/33.4

* cited by examiner

*Primary Examiner* — James J Lee
*Assistant Examiner* — Jonathan E Reinert
(74) *Attorney, Agent, or Firm* — Gardner, Linn, Burkhart & Ondersma LLP

(57) ABSTRACT

A system and method for automatically scanning an electronic system of a vehicle with an automated diagnostic scanning tool having a controller, at least one vehicle communication protocol, at least one diagnostic scanning program, and an automated control program. The automated diagnostic scanning tool is configured to be connected to the electronic system of a vehicle by a cable and detects power from the vehicle via the cable, with the automated diagnostic scanning tool further configured to select and launch a diagnostic scanning program to perform a diagnostic scan of the electronic system of the vehicle in response to detecting power from the vehicle.

20 Claims, 5 Drawing Sheets

AUTOMATED VEHICLE DIAGNOSTIC SYSTEM AND METHOD

BACKGROUND OF THE INVENTION

The present invention is directed to a system and method for automated scanning and diagnosing of an electronic system of a vehicle, such as electronic control units ("ECUs") and vehicle sensors, and in particular a system and method utilizing a vehicle diagnostic tool or device that operates to automatically scan the electronic system independent of operator input.

Vehicle diagnostic systems employing diagnostic scan devices or tools are used in automotive repair facilities to diagnose and repair computer-based vehicle systems, where vehicles may have differing computer-based systems depending on the configuration and options installed on the vehicle. Vehicle diagnostic scan systems may include or use one or more diagnostic software scanning programs or applications, such as applications developed by an original equipment automotive manufacturer ("OEM"), or an after-market diagnostic company. The diagnostic software scanning programs are used to diagnose the electronic system of a vehicle and result in a scan log file that includes information of faults in the system. Different diagnostic applications are used with different makes of vehicles, with different models of vehicles including particular electronic control units ("ECU") such that different procedures are used to perform diagnostic evaluations, including depending on the make, model and year of vehicle, as well as based on other parameters.

SUMMARY OF THE INVENTION

The present invention provides an automated vehicle diagnostic tool that operates to scan the electronic system of a vehicle substantially independent of operator actions or input.

According to an aspect of the present invention, a method of automatically scanning an electronic system of a vehicle with a diagnostic scanning tool includes connecting the diagnostic scanning tool to the electronic system of the vehicle by a cable, where the diagnostic scanning tool comprises a controller, a vehicle communication protocol, and a diagnostic scanning program. The diagnostic scanning tool detects power from the vehicle via the cable and in response automatically runs the diagnostic scanning program to perform a diagnostic scan of the electronic system of the vehicle.

In a particular embodiment, the method further includes determining that the vehicle power is turned on, where the step of automatically running the diagnostic scanning program is performed responsive to detecting with the diagnostic scanning tool power from the vehicle and determining that the vehicle power is turned on. The step of determining that the vehicle power is turned on may involve transmitting a vehicle power inquiry signal from the diagnostic scanning tool to the electronic system and receiving with the diagnostic scanning tool a responsive signal from the electronic system indicating that the vehicle power is turned on.

The diagnostic scanning tool may include multiple diagnostic scanning programs and/or multiple vehicle communication protocols, with the process of automatically running the diagnostic scanning program including selecting one of the diagnostic scanning programs and automatically running the selected one of the diagnostic scanning programs. In a further aspect of the system, the diagnostic scanning tool may be configured to obtain vehicle identification information, such as a vehicle identification number, in response to the diagnostic scanning tool detecting power from the vehicle, where a particular diagnostic application program is selected based on the vehicle identification information.

In a further particular embodiment, the diagnostic scanning tool includes an automated control program that is configured to launch the diagnostic scanning program in response to the diagnostic scanning tool detecting power from the vehicle.

According to a further aspect of the present invention, a method of automatically scanning an electronic system of a vehicle with a diagnostic scanning program includes connecting a diagnostic computer having at least one diagnostic scanning program to an electronic system of a vehicle, detecting with the diagnostic computer power from the vehicle, and automatically running the diagnostic scanning program to perform a diagnostic scan of the electronic system of the vehicle responsive to detecting with the diagnostic computer power from the vehicle.

In accordance with a particular embodiment, the method includes determining that vehicle power is turned on after detecting power from the vehicle, and automatically running the diagnostic scanning program responsive to detecting power from the vehicle and determining that the vehicle power is turned on, where the operation of determining that the vehicle power is turned on includes transmitting a vehicle power inquiry signal from the diagnostic computer to the electronic system and receiving with the diagnostic computer a responsive signal from the electronic system indicating that the vehicle power is turned on.

In a particular embodiment, the configuration of connecting the diagnostic computer to the electronic system of the vehicle includes connecting the diagnostic computer to a pass through device and connecting the pass through device with the electronic system of the vehicle. In such an arrangement the diagnostic computer may be local or remote from the vehicle.

Still further, results of the diagnostic scan may be automatically transmitted to a separate computer, including a separate computer that includes collision repair estimation software that provides repair estimation information based on the results of the diagnostic scan.

According to yet a further aspect of the present invention, an automated vehicle diagnostic system for use with an electronic system of a vehicle comprises an automated vehicle diagnostic tool configured to be connected to an electronic system of a vehicle, where the automated vehicle diagnostic tool comprises a controller, at least one vehicle communication protocol, at least one diagnostic scanning program, and an automated control program. The automated vehicle diagnostic tool is configured to detect power from the vehicle when the automated vehicle diagnostic tool is connected to the electronic system of a vehicle, and the automated control program is configured to launch the diagnostic scanning program to perform a diagnostic scan of the electronic system of the vehicle in response to the automated vehicle diagnostic tool detecting power from the vehicle.

The automated vehicle diagnostic tool may include multiple diagnostic scanning programs, with the automated control program configured to obtain vehicle identification information from the electronic system of the vehicle and based thereon select a particular one of the diagnostic scanning programs to perform a diagnostic scan of the electronic system. The automated vehicle diagnostic tool may be further configured to transmit an inquiry signal to the electronic system of the vehicle in response upon detecting power from the vehicle, and further configured to receive a signal from the electronic system of the vehicle in response to the inquiry signal to detect that the vehicle power is on. In such an embodiment, the automated control program may be configured to launch the diagnostic scanning program to perform a diagnostic scan of the electronic system of the vehicle in response to the automated vehicle diagnostic tool detecting power from the vehicle and detecting that the vehicle power is on.

The automated vehicle diagnostic system and method in accordance with the present invention is configured to perform a diagnostic scan of an electronic system of a vehicle with minimal to no actions by an operator. The automated vehicle diagnostic tool is configured to detect power from the vehicle to automatically launch a diagnostic application scanning program, where the automated vehicle diagnostic tool may interrogate the electronic system of the vehicle to determine that the vehicle power is on prior to automatically launch the diagnostic application scanning program. Still further, the automated vehicle diagnostic tool may be configured to interrogate the electronic system to obtain identifying information of the vehicle and thereby select and subsequently automatically launch an appropriate diagnostic application scanning program. These and other objects, advantages, purposes and features of this invention will become apparent upon review of the following specification in conjunction with the drawings.

DESCRIPTION OF THE PREFERRED EMBODIMENTS

Figure 1:
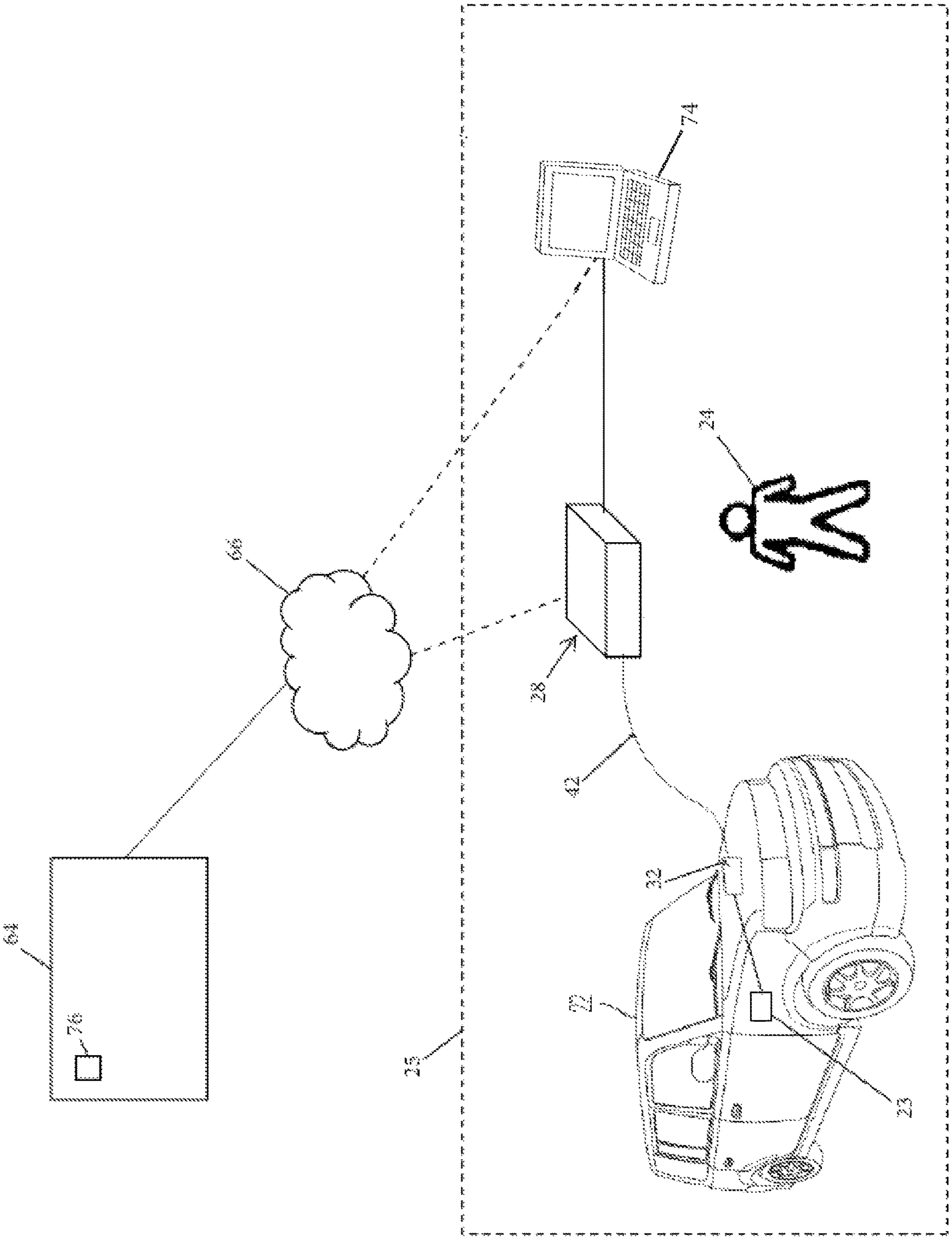
FIG. 1 is a schematic illustration of an automated vehicle diagnostic system in use with a vehicle in accordance with the present invention.

The present invention will now be described with reference to the accompanying figures, wherein the numbered elements in the following written description correspond to like-numbered elements in the figures.

With reference to FIGS. 1 to 4, an automated vehicle diagnostic system 20 for use with a vehicle 22 is shown for use by a mechanic or operator 24, such as in an automotive repair facility 25. System 20 is illustrated as including a diagnostic computer device configured as an automated vehicle diagnostic tool 28 that is configured to be connected with vehicle 22 by operator 24, such as by connecting to an on-board diagnostic ("OBD") diagnostic port 32 of the vehicle 22 in order to diagnose the electronic system 23 of vehicle 22, including to scan or diagnose various vehicle electronic control units (ECUs), such as an engine ECU 34, body ECU 36, brakes ECU 38, and/or other ECUs 40, and/or other electronic parts and components of vehicle 22, such as one or more advanced driver assistance system ("ADAS") sensors 41, where such ECUs and sensors comprise computer modules having both hardware and software, such as in the form of firmware. As discussed in more detail below, automated vehicle diagnostic tool 28 is configured to interrogate the electronic system 23 to determine or obtain identifying information of vehicle 22 to select and subsequently automatically launch an appropriate diagnostic application scanning program stored in memory of tool 28 to scan the electronic system 23. In particular, automated vehicle diagnostic tool 28 is configured to perform the automated interrogation and scan process with minimal to no actions by operator 24. For example, as also discussed in more detail below, in one embodiment tool 28 is operable to initiate the automated interrogation and scan process upon being triggered from a signal establishing a power signal from vehicle 22, where the signal may be obtained via vehicle cable 42 connecting tool 28 with port 32.

Figure 2:
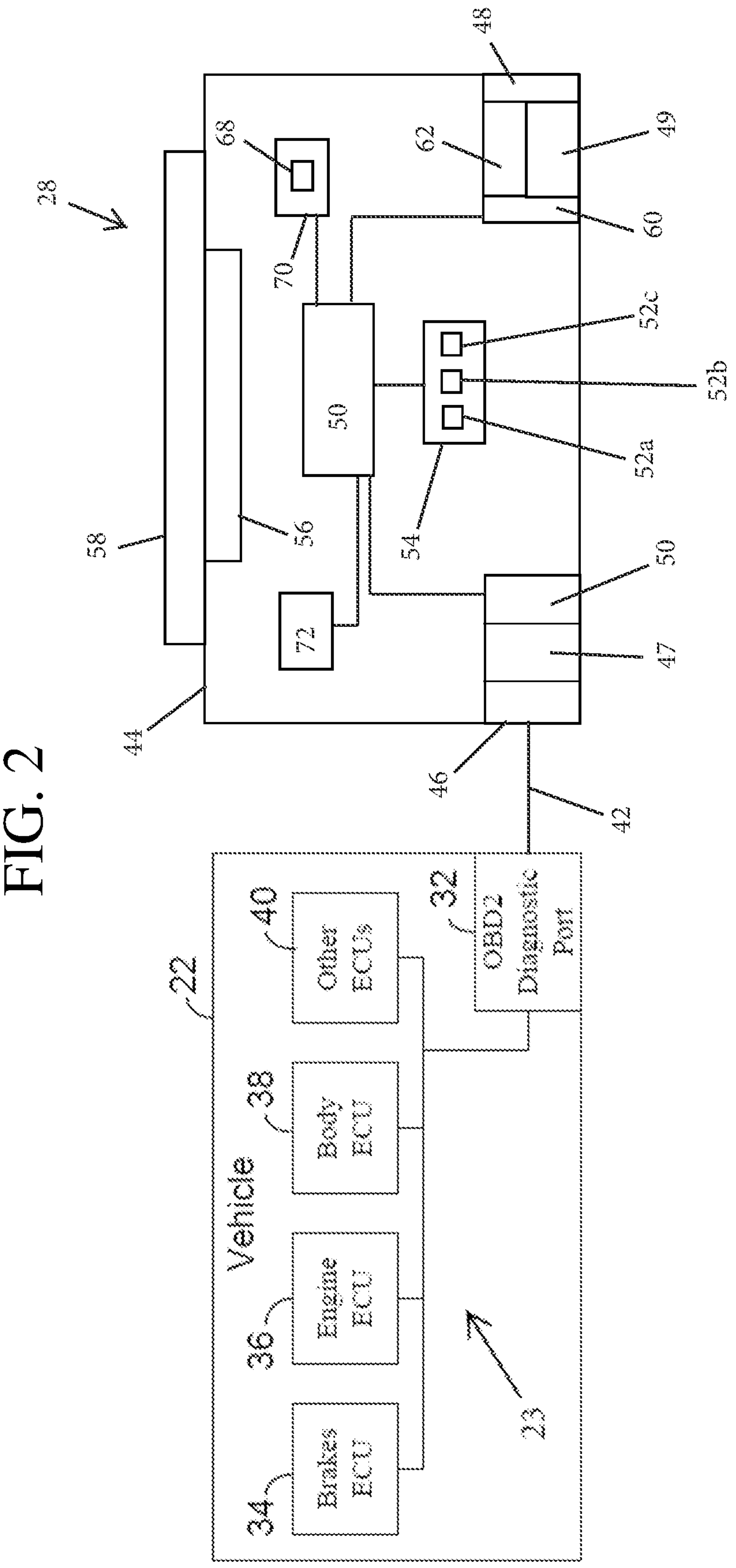
FIG. 2 is a detailed block diagram of the automated vehicle diagnostic tool and vehicle electrical system of FIG. 1.
Figure 3:
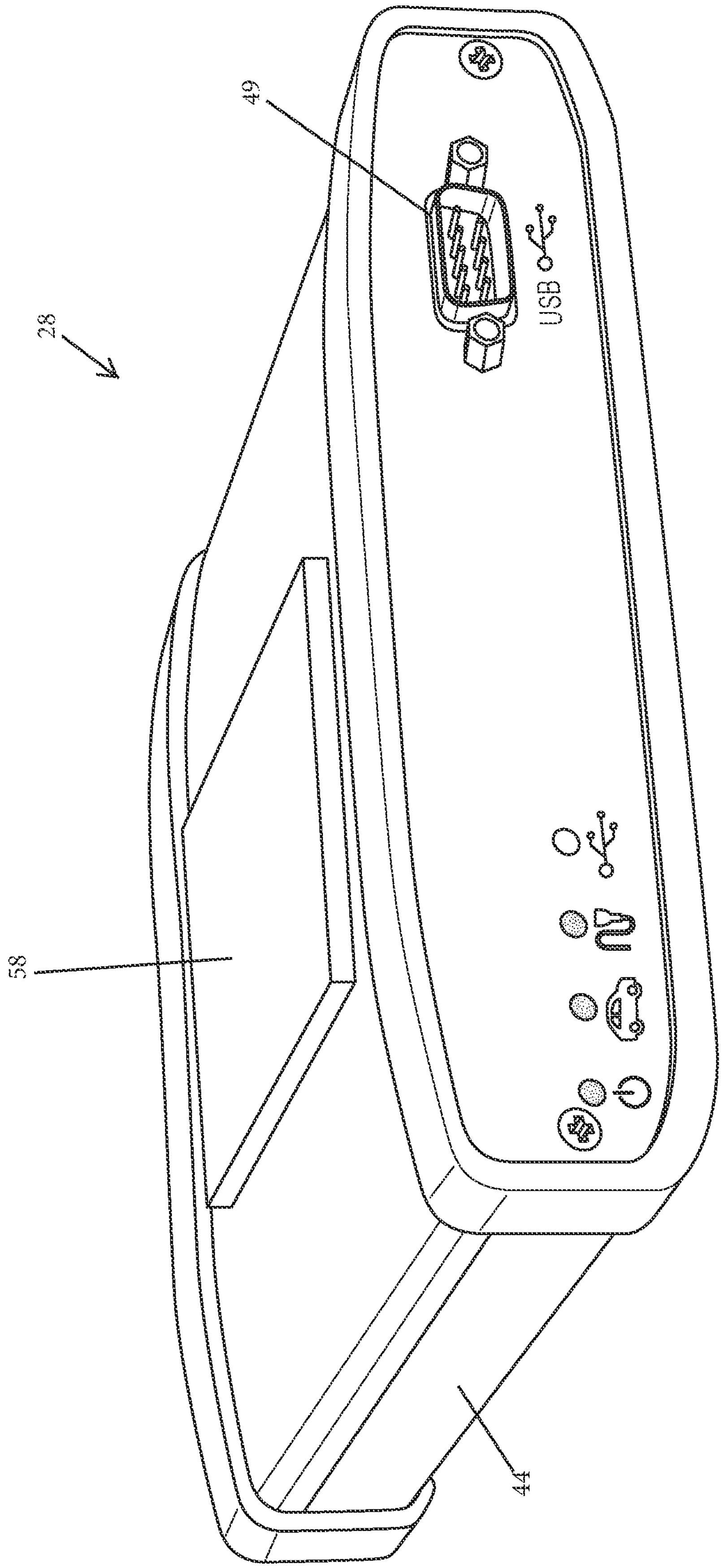
FIG. 3 is a front perspective view of the automated vehicle diagnostic tool of FIG. 1.
Figure 4:
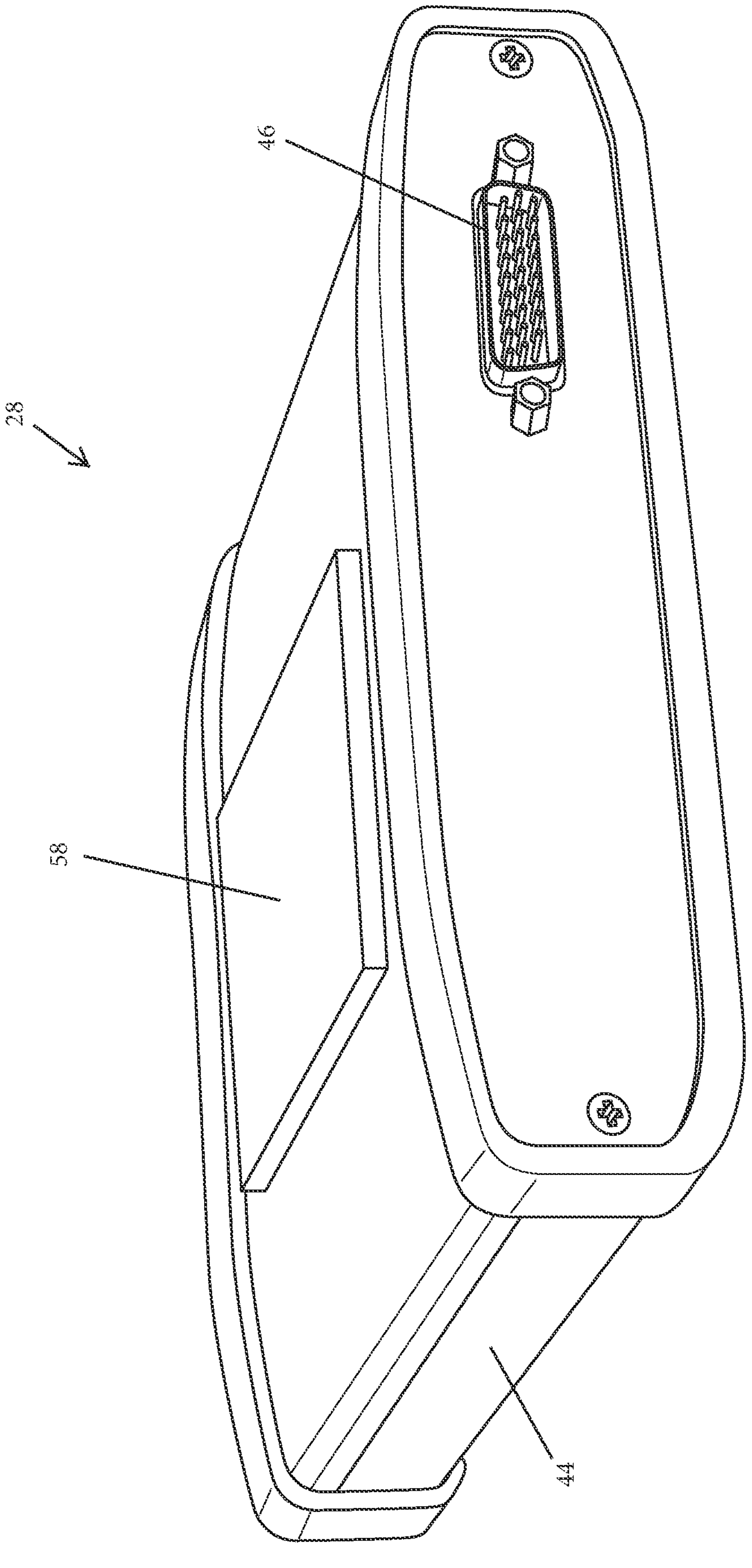
FIG. 4 is a rear perspective view of the automated vehicle diagnostic tool of FIG. 1.

Referring now to FIGS. 2 to 4, the automated vehicle diagnostic tool 28 of the illustrated embodiment includes a housing 44 supporting a receptacle or connector 46 for connecting with cable 42, where connector 38 is configured as a twenty-six pin connector for receiving one of the plug connector ends of cable 42. As shown, connector 46 is associated with a vehicle interface 47. Optionally, as discussed in more detail below, tool 28 may also include another connector 48, such as for communicatively connecting to a local or remote computer for transferring diagnostic scan data obtained from scanning an electronic system 23 of vehicle 22. As shown, tool 28 includes an external computer interface 49 associated with connector 48, with connector 48 configured as a USB connector in the illustrated embodiment. Alternatively, however, tool 28 may connect with a local or remote computer via an alternative interface, such as Bluetooth, Wi-Fi, or the like.

With further reference to FIG. 2, automated diagnostic tool 28 additionally includes one or more controllers 50, such as in the form of processors or micro-processors, for managing operation and/or directing the flow of data within tool 28 and/or with electronic system 23, and/or with a local or remote computer, as well as for executing and operating software programs, with tool 28 including interface circuitry to facilitate communication between the ECUs and the tool 28. Automated diagnostic tool 28 also includes a database of one or more vehicle communication protocols found in a local memory 50 that allow communication with the ECUs of various makes and models of vehicles, such as SAE J1850 PWM, SAE J1850 VPW, ISO9141-2, ISO14230-4 (KWP2000), and/or ISO 15765-4/SAE J2480.

Tool 28 further includes a database of one or more different diagnostic applications or diagnostic application scanning programs 52*a*, 52*b*, 52*c* stored in memory 54 for scanning the electronic system 23 of vehicle 22, where a given scanning program is run depending on, for example, the make, model and year of vehicle 22. Although shown as including three such diagnostic application scanning programs 52*a*, 52*b*, 52*c*, it should be appreciated that memory 54 may include more than three such diagnostic scanning programs, where each such scanning program may be provided for a particular type or series of vehicles based on, for example, the make, model and year. The diagnostic application scanning programs 52*a*, 52*b*, 52*c* may further be configured for particular scanning operations, such as for performing a full scan of electronic system 23 or for performing a more limited scan directed to particular electronic systems or sub-systems of vehicle 22.

An operator interface 56 may optionally be provided on automated diagnostic tool 28, where operator interface 56 includes a display screen 58, such as a touch screen. Screen 58 may be used to provide data to operator 24, such as reporting the completion of a scan process, an error, or regarding results of a diagnostic scan of the electronic system 23 of vehicle 22. In the illustrated embodiment automated diagnostic tool 28 further includes a remote interface 60, that may be part of or associated with the external computer interface 49, and an internal modem 62, whereby results of a diagnostic scan performed using tool 28 may be transmitted to a remote computer 64 via an internet connection 66.

Automated diagnostic tool 28 additionally includes an automated control program 68 stored in memory 70. Automated control program 68 may be configured as one or more software or program modules that, as discussed in detail below, operate to automatically launch a diagnostic application scanning program 52*a*, 52*b*, 52*c* when tool 28 is connected with an electronic system 23 of a vehicle 22 with minimal to no actions by operator 24.

In a particular embodiment, automated diagnostic tool 28 is configured to detect when it is connected to electronic system 23 of vehicle 22 by way of a signal received via cable 42, such as by detecting power or a power signal from vehicle 22. In one embodiment the power may be, for example, a battery voltage signal from the battery of vehicle 22 that is on port 32. The vehicle power itself, however, may or may not be turned on or activated by the vehicle ignition. That is, even though power from the vehicle battery is detected, the vehicle power may or may or may not be activated such that dashboard lights are illuminated and/or power is supplied to the ECUs. Upon receipt of an initial power signal or tool 28 detecting the battery power of vehicle 22, automated diagnostic tool 28 may be triggered to fully power up. For example, automated control program 68 may be triggered or initiated by the vehicle power signal, with program 68 subsequently initializing the powering up of tool 28. Automated diagnostic tool 28 may include an internal battery, or include a power cable for plugging into a power source, or may be fully powered by vehicle 22 itself without the need for a battery or plug-in power source.

Upon powering up after receipt of such a triggering power signal, such as detecting the battery power of vehicle 22, automated diagnostic tool 28 may in turn send a signal on the vehicle protocols to the electronic system 23 to determine if the vehicle power is turned on. For example, the vehicle power being on can occur by the ignition power being on at the vehicle 22, such as by an ignition key being turned or an ignition button being pushed whereby the lights on the dashboard are active, including accessories, or the vehicle may be running, and is thus in a state for diagnostic scanning with power at the ECUs. Alternatively, the initial receipt of power from the vehicle 22 may itself be used to launch the automated scanning operation or as an indication that the power is on at the vehicle.

Upon receiving the power trigger signal or confirming that the vehicle power is on, automated control program 68 then operates to enable tool 28 to obtain information from electronic system 23 to determine specifics regarding the vehicle 22 to be scanned. For example, automated control program 68 may operate to obtain the vehicle identification number ("VIN") of vehicle 22 that is stored in or accessible via electronic system 23, with automated control program 68 operating to enable the parsing or interpreting of the VIN to thereby determine the make, model and year of vehicle 22. Automated diagnostic tool 28 may, for example, include a database 72 used to interpret the VIN to determine the make, model and year of vehicle 22 that is to be scanned. In addition to determining the make, model and year of vehicle 22, the interpreting operation may also include interpreting as to particular options on vehicle 22, which may impact the selection of a particular diagnostic application scanning program 52*a*, 52*b*, 52*c* to be used to scan the electronic system 23. The process of reading a VIN by a scan tool to then use that VIN to determine which database of scan information should be used to query the vehicle is a typical operation.

Upon determination of the specifics of vehicle 22, automated control program 68 causes the appropriate one of the diagnostic application scanning program 52*a*, 52*b*, 52*c* to be automatically selected for the vehicle 22, and launches the scanning operation of the electronic system 23 by the selected scanning program to be performed. Upon a successful scan being run, such as a scan that is able to be run to completion or check all appropriate electronic components such as ECUs for diagnostic trouble codes, the automated diagnostic tool 28 is operable to display a notification to operator 24 that the scan was successful, such as by way of such an indication on screen 58. Alternatively, or additionally, diagnostic tool 28 may be provided with indicator lights, such as LED indicators, where particular colors or indicator lights may be used to signal a successful or unsuccessful scan. For example, a green color may be used to indicate a successful scan, and a red color used to indicate an unsuccessful scan. The unsuccessful scan may result, for example, from the scan not being completed, such as due to a loss of power from vehicle 22, or the like.

Optionally, automated diagnostic tool 28 may display results of the scan on screen 58, such as indicating particular diagnostic trouble codes that were located. Still further, tool 28 may be configured to transmit the results of the scan to a remote computer, such as to remote computer 64 via internet connection 66, where such transmission may occur directly via tool 28 and its onboard internal modem 62, or may be transmitted via a connection of tool 28 with a local computer 74, where the local computer 74 in turn transmits data to remote computer 64. Still further, the results of the scan may be transmitted to and reside on local computer 74 without being transmitted to a remote computer. Such a local computer 74 may also be employed for reviewing of the results of the scan, including for example if automated diagnostic tool 28 does not include a screen 58.

Accordingly, by way of automated vehicle diagnostic system 20, an operator need only connect the automated vehicle diagnostic tool 28 to the vehicle 22 with power being on at vehicle 22 such that a diagnostic scan of the electronic system 23 of vehicle 22 will be automatically performed.

In a particular embodiment, the scan results may be transmitted from automated diagnostic tool 28 to a collision estimating software 76, such as residing on a local computer 74 or remote computer 64. The collision estimating software 76 may be used to provide a cost estimate for repairs to vehicle 22 resulting from a collision, where the scan results may be used as an indicator of damaged components of vehicle 22 requiring repair. Still further, in addition to transmitting scan results to the collision estimating software 76, automated diagnostic tool 28 may be further configured to transmit an invoice for the scan operation to bill to a customer, such as the owner of vehicle 22, or to bill to an insurer of vehicle 22. An example of such a collision estimating software is MITCHELL CLOUD ESTIMATING software provided by Mitchell International of San Diego, California.

Figure 5:
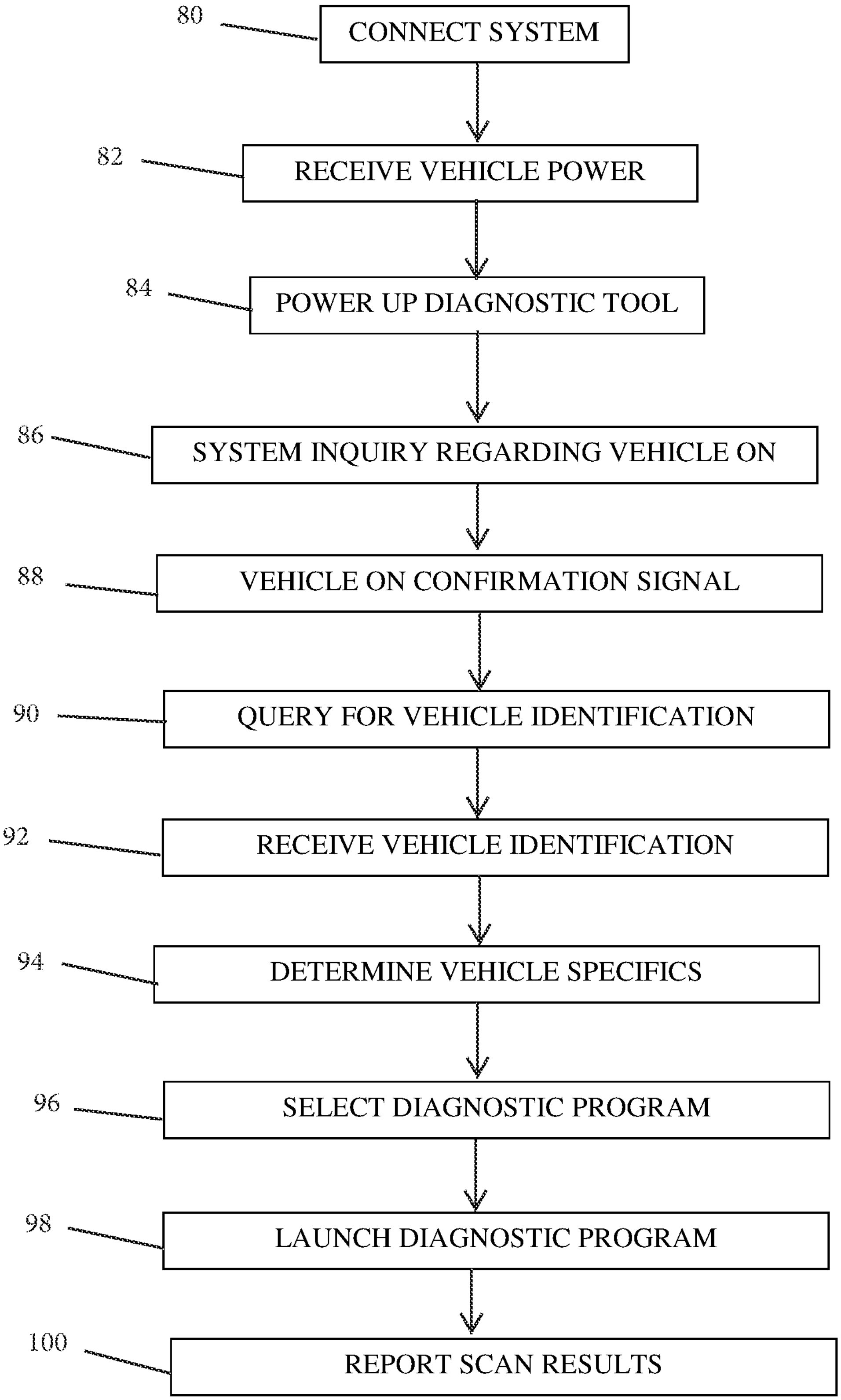
FIG. 5 is a flow diagram of a method of operation of the automated vehicle diagnostic tool in accordance with the present invention.

A method of operation of an automated vehicle diagnostic system 20 in accordance with the present invention is illustrated in FIG. 5. As there shown, step 80 illustrates the connection of the electronic system 23 of vehicle 22 with the system 20 by an operator, such as the connection of automated diagnostic tool 28 whereby the tool 28 is communicatively coupled with the electronic system 23. Step 82 illustrates the receiving and detection of a power signal by the automated vehicle diagnostic system 20, such as tool 28 receiving a power signal from port 32. Step 84 illustrates system 20 fully powering up upon receipt of the power signal at step 82, such as for example, automated diagnostic tool 28 powering up. Step 86 illustrates system 20 sending an inquiry to electronic system 23 to determine if the vehicle power is on whereby ECUs are powered, with step 88 illustrating receipt of a signal confirming that vehicle power is on, such as for example, that the vehicle ignition key or start button has been depressed whereby the dash lights are on. Step 90 illustrates system 20 interrogating the electronic system 23 of vehicle 22 to obtain vehicle identification information, with step 92 illustrating system 20 receiving the vehicle identification information, such as tool 28 receiving the VIN of vehicle 22. Step 94 in turn illustrates the interpretation by system 20 of the vehicle identification information, such as the parsing or interpretation of the VIN by tool 28 via a database contained within tool 28, so as to determine specifics of the vehicle 22, such as the make, model and year of vehicle 22. Step 96 illustrates the selection by system 20 of a particular diagnostic scanning application for use with the identified vehicle 22, and step 98 illustrates the launching of the selected diagnostic scanning application to diagnose the electronic system 23 of vehicle 22. And as illustrated in step 100, the results of the diagnostic scan are reported, published or provided as desired. For example, the diagnostic scan results may be provided to the operator 24 on a screen 58 of tool 28, or may be transmitted to a remote computer 64, or may be transmitted to a collision estimating software retained on a remote computer 64, or the like.

In an alternatively configured automated vehicle diagnostic system the automated diagnostic tool 28 may be configured as a pass through device, such as in accordance with SAE J2534, with operational controls of the alternative system being located on a separate diagnostic computer device or network, such as a local computer 74 or remote computer 64. For example, such a pass through device or tool would be connectable to a local computer 74 by a USB cable. The local computer 74 may in turn be connected to a remote computer 64 via an internet connection 66. Alternatively, such a pass through device or tool may alternatively be configured to connect directly with the remote computer 64 via an internal modem 62. Still further, in such a configuration one or more vehicle communication protocols would still be found in a local memory 50 of such a pass through device or tool to allow communication with the ECUs of various makes and models of vehicles. Various hardware and software aspects of tool 28 disclosed in FIG. 2, however, would alternatively be located in the separate computer, such as for example the database of diagnostic application scanning program 52*a*, 52*b*, 52*c* and one or more aspects of automated control program 68. In such a configuration, for example, upon a connection being made between the vehicle 22, pass through device or tool and the separate computer, the separate computer may thereby automatically receive a power signal, such as from the battery of the vehicle 22, indicating that the connection has been made. That is, the battery power signal is transmitted from the port 32 of vehicle 22 through the cable 42 to the pass through tool, and the pass through tool in turn is configured via an automated control program to send a signal to the separate computer indicating as such. The separate computer may then send a signal via the automated control program 68 and through the pass through configured tool 28 to determine via a return signal if the vehicle is turned on such that vehicle power is on at vehicle 22, that is, if the ignition key is turned or button depressed whereby lights are on at the dash and the ECUs are receiving power. Upon receiving a confirmation, the automated control program 68 operates to automatically perform a diagnostic scan of the electronic system 23 of vehicle 22, such as by way of obtaining the VIN and determining and launching the correct application scanning program, as well as providing automated reporting or interfacing with a collision estimating software.

It should be appreciated that the illustration of automated diagnostic tool 28 in FIG. 2 is necessarily schematic in nature and that a person of skill in the art would understand the construction and operation of tool 28 based on the disclosure herein. As noted, automated scan program 68 may be configured as a single program or module or may be configured as multiple programs or modules that operate together. In the illustrated embodiment discussed above, automated diagnostic tool 28 receives a power signal upon being connected to the electronic system 23 of the vehicle 22 and subsequently sends a signal over the vehicle protocols contained in memory 50 to determine if the vehicle ignition power is turned on by way of the ignition key or button. It should be appreciated, however, that automated diagnostic tool 28 may operate in alternative manners to launch a diagnostic scan with limited operator 24 involvement. For example, an alternatively configured tool may be configured to be turned on by an operator, such as by a switch or the like, in which case upon being turned on the tool may operate to determine if the vehicle ignition power is turned on and/or operate to read the VIN from the electronic system 23. Still further, although automated diagnostic tool 28 is described above has having various designated memories, it should be appreciated that the internal memory may be provided by one or more memory chips. In a still further embodiment, an operator 24 may also be queried as to whether the vehicle 22 has certain options or features, such as by way of screen 58, for selection of the appropriate diagnostic scanning application program.

Other changes and modifications in the specifically described embodiments can be carried out without departing from the principles of the present invention which is intended to be limited only by the scope of the appended claims, as interpreted according to the principles of patent law including the doctrine of equivalents.

The embodiments of the invention in which an exclusive property or privilege is claimed are defined as follows:

1. A method of automatically scanning an electronic system of a vehicle with a diagnostic scanning tool, said method comprising:

connecting the diagnostic scanning tool to the electronic system of the vehicle by a cable, wherein the diagnostic scanning tool comprises a controller, a vehicle communication protocol, and a diagnostic scanning program;

detecting with the diagnostic scanning tool a battery voltage from the vehicle via the cable;

automatically transmitting a vehicle power inquiry signal from the diagnostic tool via the vehicle communication protocol to the electronic system of the vehicle responsive to said detecting with the diagnostic scanning tool the battery voltage from the vehicle;

determining that the vehicle power is turned on via the vehicle power inquiry signal from the diagnostic scanning tool to the electronic system by receiving with the diagnostic scanning tool a responsive signal from the electronic system indicating that the vehicle power is turned on; and automatically running the diagnostic scanning program responsive to said determining that the vehicle power is turned on to perform a diagnostic scan of the electronic system of the vehicle.

2. The method of claim 1, wherein the vehicle power is turned on comprises the vehicle is running or the vehicle ignition power is on.

3. The method of claim 2, wherein the vehicle ignition power is on comprises an ignition key being turned on or an ignition button being pushed whereby dashboard lights of the vehicle are active.

4. The method of claim 1, wherein the diagnostic scanning tool includes a plurality of diagnostic scanning programs and wherein said automatically running the diagnostic scanning program comprises selecting one of the diagnostic scanning programs and automatically running the selected one of the diagnostic scanning programs.

5. The method of claim 4, wherein the diagnostic scanning tool includes a plurality of vehicle communication protocols.

6. The method of claim 4, further comprising obtaining vehicle identification information with the diagnostic scanning tool responsive to said detecting with the diagnostic scanning tool power from the vehicle, and wherein said selecting one of the diagnostic scanning programs comprises selecting one of the diagnostic scanning programs based on the vehicle identification information.

7. The method of claim 6, wherein said obtaining vehicle identification information comprises obtaining vehicle identification number information, and wherein said selecting one of the diagnostic scanning programs based on the vehicle identification information comprises selecting one of the diagnostic scanning programs based on the vehicle identification number.

8. The method of claim 1, wherein said diagnostic scanning tool further comprises an automated control program, and wherein said automated control program is configured to launch the diagnostic scanning program responsive to said detecting with the diagnostic scanning tool power from the vehicle to perform the diagnostic scan of the electronic system of the vehicle.

9. A method of automatically scanning an electronic system of a vehicle with a diagnostic scanning program, said method comprising:

connecting a diagnostic computer to an electronic system of a vehicle, wherein the diagnostic computer includes at least one diagnostic scanning program;

detecting with the diagnostic computer a battery voltage from the vehicle;

automatically transmitting a vehicle power inquiry signal from the diagnostic computer via a vehicle communication protocol to the electronic system of the vehicle responsive to said detecting with the diagnostic computer the battery voltage from the vehicle;

determining that the vehicle power is turned on via the vehicle power inquiry signal from the diagnostic computer to the electronic system by receiving with the diagnostic computer a responsive signal from the electronic system indicating that the vehicle power is turned on; and automatically running the diagnostic scanning program responsive to said determining that the vehicle power is turned on to perform a diagnostic scan of the electronic system of the vehicle.

10. The method of claim 9, wherein vehicle power is turned on comprises the vehicle is running or the vehicle ignition power is on.

11. The method of claim 10, wherein the vehicle ignition power is on comprises an ignition key being turned on or an ignition button being pushed whereby dashboard lights of the vehicle are active.

12. The method of claim 9, wherein said connecting the diagnostic computer to the electronic system of the vehicle comprises connecting the diagnostic computer to a pass through device and connecting the pass through device with the electronic system of the vehicle.

13. The method of claim 12, wherein the diagnostic computer comprises a computer local to the vehicle.

14. The method of claim 12, wherein the diagnostic computer comprises a remote computer remote from the vehicle.

15. The method of claim 9, further comprising automatically transmitting results of the diagnostic scan upon completion to a separate computer.

16. The method of claim 15, wherein the separate computer includes an automatic collision repair estimation software and wherein the automatic collision repair estimation software provides repair estimation information based on the results of the diagnostic scan.

17. An automated vehicle diagnostic system for use with an electronic system of a vehicle, said system comprising:

an automated vehicle diagnostic tool configured to be connected to an electronic system of a vehicle, said automated vehicle diagnostic tool comprising a controller, at least one vehicle communication protocol, at least one diagnostic scanning program, and an automated control program;

wherein said automated vehicle diagnostic tool is configured to detect battery voltage from the vehicle when said automated vehicle diagnostic tool is connected to the electronic system of a vehicle, and wherein via said automated control program said automated vehicle diagnostic tool is further configured to;

automatically transmit an inquiry signal via the vehicle communication protocol to the electronic system of the vehicle in response to detecting battery voltage from the vehicle;

receive a signal from the electronic system of the vehicle in response to said inquiry signal to detect that the vehicle power is on; and launch said diagnostic scanning program to perform a diagnostic scan of the electronic system of the vehicle in response to said automated vehicle diagnostic tool detecting vehicle power is turned on.

18. The system of claim 17, wherein said automated vehicle diagnostic tool comprises a plurality of diagnostic scanning programs, and wherein said automated control program is configured to obtain vehicle identification information from the electronic system of the vehicle and based thereon select a particular one of said diagnostic scanning programs to perform a diagnostic scan of the electronic system of the vehicle.

19. The system of claim 17, wherein vehicle power being turned on comprises the vehicle is running or the vehicle ignition power is on.

20. The system of claim 17, wherein said automated control program comprises a plurality of program modules.

* * * * *